Patented Dec. 1, 1925.

1,563,875

UNITED STATES PATENT OFFICE.

SHERMAN W. SCOFIELD AND JOHN B. LA RUE, OF CLEVELAND, OHIO; SAID LA RUE ASSIGNOR TO SAID SCOFIELD.

PROCESS OF SEPARATING THE CONSTITUENTS OF MINERAL SILICATES.

No Drawing.  Application filed February 4, 1924. Serial No. 690,656.

*To all whom it may concern:*

Be it known that we, SHERMAN W. SCOFIELD and JOHN B. LA RUE, citizens of the United States, residents of Cleveland, county of Cuyahoga, and State of Ohio, have invented new and useful Improvements in Processes of Separating the Constituents of Mineral Silicates, of which the following is a specification, the principle of the invention being herein explained and the best mode in which we have contemplated applying that principle, so as to distinguish it from other inventions.

This application is a continuation in part of application Serial No. 407,724 filed by us September 2, 1920.

Our invention relates to processes for separating the constituents of mineral silicates, and particularly to processes for extracting aluminum, potassium and silicon from potash feldspar. The claims of this application, however, are limited to the recovery of the potassium, the steps resulting in the separation of the aluminum and the silicon being claimed in other applications.

The following description sets forth in detail certain steps embodying our invention, the disclosed steps, however, constituting but one of the various methods by which the principle of the said invention may be used.

We first crush the crystalline potash-feldspar or reduce the same to small particles and then calcine the same until it is converted into a so-called amorphous state. The temperature to which it is subjected during the calcining process is substantially 1350° to 1400° centigrade. The feldspar in its natural crystalline form is only slightly soluble in solutions of caustic alakli but in the amorphous state is capable of being decomposed by a solution of caustic alkali at a high temperature and under pressure. We then mix the amorphous feldspar with caustic alakali and water and seal the same tightly in a digester. The strength of caustic alkali which we utilize is substantially ninety (90) per cent. The mixture is agitated and heated for two or three hours, the pressure rising to substantially 300 pounds per square inch and the temperature to substantially 265° to 271° centigrade. This action results in substantially complete digestion except that the insoluble silicates still remain in the digester in a crystalline form. Then the heat is continued and the moisture in the digester commences to be absorbed by the mass at the bottom of the digester, resulting in the bringing down of the pressure to substantially 100 pounds and the consequent raising of the temperature to 350° to 400° centigrade or even 500° centigrade. This results in the insoluble silicates becoming fused and the conversion of the silicic acid into silica. Then more water is added to the digester, according to the space that is afforded, causing the pressure to rise rapidly and the temperature to drop, the digestion thus reaching a point substantially 98 to 99 per cent complete. Substantially all of the constituents of the feldspar have now been converted into water soluble compounds. The heat is then shut off and the mass allowed to stand for substantially one hour. The digester then contains a concentrated solution of alkali-metal silicate and aluminate. The term "ninety (90) per cent caustic potash" used in the claims is merely a grade designation. It means that caustic potash with a KOH content of ninety (90) per cent or better should be used. In the development upon which this application is based, standard caustic potash was used for the digestion, such as Schiefflein or Innes-Speiden, except where the caustic was obtained from the process itself for reuse. In buying the standard potashes for the purpose a ninety (90) per cent grade or better was obtained.

We then add sufficient water to the solution of alkali-metal silicate and aluminate to thin down the mass to receive carbonic acid gas in a manner hereinafter fully explained.

The resultant mother liquor contains substantially 12 to 14 per cent alkali-metal, 18 to 20 per cent aluminum and the balance silica, when utilizing the proportions now to be mentioned.

For purposes of illustration, in the above described steps of our improved process, we wish to state that substantially four pounds potassium feldspar can be treated as above set forth, the amount of caustic alkali (for instance, potassium hydrate) utilized being substantially six pounds, and the amount of water added first to the digester being substantially four pounds, and then four pounds more after the complete fusion has taken place to complete the digestion. For thinning down the final mass to make the mother liquor suitable for receiving the carbonic acid gas, sufficient water, as required, can be utilized.

The mother liquor is placed in a standard carbonator tank and carbonic acid gas introduced, in the cold, and under slight pressure whereby silicic acid and aluminum hydroxide are precipitated and the solution contains potassium carbonate. The pressure which we utilize is additional to that normally incident to carbonating. We effect the carbonation in the cold by positively removing the heat generated by the carbonating step. This solution is decanted off, and the precipitate leached, and the leaching water added to the decanted solution. The silica and aluminum hydroxide are then comparatively dry. The step results, of course, in the recovery of the potassium from the feldspar.

What we claim is:

1. In the process of converting potash-feldspar into alkali-metal silicate and aluminate by means of converting crystalline feldspar into amorphous feldspar and heating a mixture of said amorphous feldspar and a solution of caustic alkali in a closed vessel, the method of completely converting the feldspar into water-soluble compounds consisting in, utilizing, for the alkali digestion step, substantially ninety (90) per cent caustic alkali in amount from one (1) to two (2) times by weight of the feldspar and an amount of water substantially equal to the feldspar, together with a pressure of substantially three hundred (300) pounds per square inch and a temperature of substantially 270° C., the treatment being continued until substantially all the normally insoluble constituents are fused, and then adding more water.

2. In the process of converting potash-feldspar into potassium silicate and aluminate by means of converting crystalline feldspar into amorphous feldspar and heating a mixture of said amorphous feldspar and a solution of caustic potash in a closed vessel, the method of completely converting the feldspar into water-soluble compounds consisting in, utilizing, for the alkali digestion step, substantially ninety (90) per cent caustic potash in amount substantially one and one-half (1½) times by weight of the feldspar and an amount of water substantially equal by weight to the feldspar, together with a pressure of substantially three hundred (300) pounds per square inch and a temperature of substantially 270° C. maintained for two (2) to three (3) hours, the mixture being agitated, and then continuing the heating until substantially all the normally insoluble constituents are fused, and then adding more water.

3. The process of separating the constituents of potash-feldspar consisting in, first, converting feldspar from a crystalline to an amorphous condition; heating the converted feldspar in a closed vessel, at a temperature of substantially 270° C. and a pressure of substantially three hundred (300) pounds per square inch, with substantially ninety (90) per cent caustic alkali in amount from one (1) to two (2) times by weight of the feldspar and an amount of water substantially equal to the feldspar, until substantially all the insoluble constituents are fused; adding more water and discontinuing the heating; allowing the mass to cool; thinning the same with water and carbonating to recover the potassium.

4. The process of separating the constituents of potash feldspar consisting in, first, calcining the feldspar sufficiently to convert it from a crystalline to an amorphous condition; heating the converted feldspar in a closed vessel, at a temperature of substantially 270° C. and a pressure of substantially three hundred (300) pounds per square inch with substantially ninety (90) per cent caustic potash in amount substantially one and one-half (1½) times by weight of the feldspar, and an amount of water substantially equal to the feldspar, the mixture being agitated and the treatment continued for from two (2) to three (3) hours; continuing the heating until substantially all the insoluble constituents are fused; adding more water in an amount substantially equal by weight to the feldspar and discontinuing the heating; allowing the mass to cool; thinning the mass with water and treating with carbonic acid gas, in the cold and under pressure additional to that normally incident to carbonation, to recover the potassium.

Signed by us, this 31st day of January 1924.

SHERMAN W. SCOFIELD.
JOHN B. LA RUE.